United States Patent
Sumi et al.

(10) Patent No.: US 6,986,854 B2
(45) Date of Patent: Jan. 17, 2006

(54) MOLDED ARTICLE LAMINATED WITH FABRIC AND METHOD FOR REPROCESSING THE SAME

(75) Inventors: Takehiko Sumi, Ebina (JP); Tetuya Fukumoto, Yamato (JP)

(73) Assignee: Kyoraku Co. Ltd., Kyoto (JP)

( * ) Notice: Subject to any disclaimer, the term of this patent is extended or adjusted under 35 U.S.C. 154(b) by 428 days.

(21) Appl. No.: 10/426,273

(22) Filed: Apr. 30, 2003

(65) Prior Publication Data

US 2003/0201564 A1    Oct. 30, 2003

Related U.S. Application Data

(60) Continuation-in-part of application No. 09/598,823, filed on Jun. 21, 2000, now abandoned, which is a division of application No. 09/219,408, filed on Dec. 23, 1998, now Pat. No. 6,451,417.

(30) Foreign Application Priority Data

Dec. 26, 1997  (JP) .................................. 9-369501

(51) Int. Cl.
B29B 9/12     (2006.01)
(52) U.S. Cl. ...................... 264/141; 264/911; 264/913; 264/917; 264/920; 264/921
(58) Field of Classification Search ............... 264/141, 264/571, 572, 328.1, 171.1, 172.13, 319, 264/913, 920, 921, 917, 911; 428/402
See application file for complete search history.

(56) References Cited

U.S. PATENT DOCUMENTS

| | | | |
|---|---|---|---|
| 4,772,664 A * | 9/1988 | Ueda et al. ............... | 525/92 B |
| 4,939,027 A | 7/1990 | Daimon et al. | |
| 5,109,052 A * | 4/1992 | Kasai et al. .............. | 524/505 |
| 5,202,071 A * | 4/1993 | Nakamura et al. ........ | 264/137 |
| 5,294,384 A | 3/1994 | David et al. | |
| 5,498,667 A | 3/1996 | David et al. | |
| 5,569,424 A | 10/1996 | Amour | |
| 5,672,403 A | 9/1997 | Hara et al. | |
| 5,679,456 A * | 10/1997 | Sakai et al. ............... | 428/340 |

(Continued)

FOREIGN PATENT DOCUMENTS

EP            528246 A2      2/1993

(Continued)

OTHER PUBLICATIONS

Peters, Don, "Plastic Blow Molding Handbook", SPE, Chapter 2—Extrusion Blow Molding, pp 21-59.

(Continued)

Primary Examiner—Mark Eashoo
(74) Attorney, Agent, or Firm—Maine & Asmus

(57) ABSTRACT

The present invention relates to a molded article laminated with fabric wherein a thermoplastic resin (A) has a fabric, made up of fibers of a highly heat resisting thermoplastic resin (B), adhered to the surface thereof, wherein the thermoplastic resin (A) of the molding contains the highly heat resisting thermoplastic resin (B) constituting the fibers and wherein the highly heat resisting thermoplastic resin (B) is present as a microdispersion of melt-blended minute particles in the thermoplastic resin (A), and a method not only for reprocessing the mold flashes at the time of the preparation of molded articles laminated with fabric but also for reprocessing the defective molded articles laminated with fabric which come from the production line and are destined to be discarded.

12 Claims, 3 Drawing Sheets

U.S. PATENT DOCUMENTS

| | | |
|---|---|---|
| 5,728,741 A | 3/1998 | Zegler et al. |
| 5,759,465 A | 6/1998 | Ha |
| 5,770,134 A | 6/1998 | Hara et al. |
| 5,801,205 A | 9/1998 | Nishibori et al. |
| 5,854,149 A * | 12/1998 | Nagayama et al. ......... 442/394 |
| 6,017,970 A | 1/2000 | Chen |
| 6,241,168 B1 | 6/2001 | Young et al. |
| 6,306,318 B1 | 10/2001 | Ricciardelli et al. |
| 6,451,417 B1 * | 9/2002 | Sumi et al. .............. 428/297.4 |
| 2002/0031653 A1 | 3/2002 | Ricciardelli et al. |

FOREIGN PATENT DOCUMENTS

EP   623448 A1   11/1994

OTHER PUBLICATIONS

Rathgerber, J., "Blow Molding Handbook", Hanser Publishers, Chapter 23—Evolution of an Imaginative Technology—Double Wall Blow Molding, pp 827-837.

* cited by examiner

MOLDED ARTICLE LAMINATED WITH FABRIC AND METHOD FOR REPROCESSING THE SAME

CROSS REFERENCE TO RELATED APPLICATIONS

This application is a continuation-in-part application related to U.S. Non-Provisional patent application Ser. No. 09/598,823, filed on Jun. 21, 2000 now abandoned, which is a divisional application of then U.S. application Ser. No. 09/219,408, filed Dec. 23, 1998, now issued U.S. Pat. No. 6,451,417, and which claims priority from a Japanese patent application No. 9-369501 filed on Dec. 26, 1997. All applications are incorporated herein by reference for all purposes.

BACKGROUND OF THE INVENTION

Technical Field of the Invention

The present invention relates to a molded article laminated with fabric which is prepared by adhering a fabric made up of highly heat resisting fibers to the surface of a molding produced from a thermoplastic resin and to a method for reprocessing the molded article laminated with fabric.

Plastic moldings, which are used in such applications as inner walls, partitions and doors of buildings, and head rests, arm rests and solid portions of console boxes of automobiles and which are molded articles laminated with fabric, are described in Japanese patent application Publication (JP-B) No. 63-51,088.

In the case of the molded articles laminated with fabric described in JP-B No. 63-51,088, as will be seen in FIG. 1, a fiber sheet is present in part of the mold flash when the molding is prepared. Generally, mold flashes which contain no fiber sheet are reprocessed without any treatment. The mold flashes and defective moldings which contain a fiber sheet are actually discarded without being reused. This is because the residual fiber sheet brings about the problem that the difference in bulk density between fibrous portions and the resinous portions causes nonuniformity in the charging amount to an extruder thereby making the extruded amount unstable. In addition, the reuse of the mold flashes containing a fiber sheet brings about the problem that fibrous lumps remain on the surface of the moldings obtained thereby impairing the appearance and significantly reducing the physical strength of the moldings.

Accordingly, for the preparation of a mold article laminated with fabric, the mold structure needs to be designed so that the amount of mold flashes is minimized. Despite such precaution in designing, however, fiber sheets needs to be carefully removed manually if the mold flashes containing the fiber sheets are reused.

In view of the actual situation where a large amount of molded articles laminated with fabric are widely used in the field of automobile industry, construction industry and the like, it is extremely difficult to manually remove the fiber sheets from the mold flashes in terms of productivity. Therefore, it is an inevitable consequence that the mold flashes are forced to be discarded in the face of the fact that the recycling of plastics is strongly encouraged.

SUMMARY OF THE INVENTION

Accordingly, an object of the present invention is to provide a method not only for reprocessing the mold flashes at the time of the preparation of molded articles laminated with fabric but also for reprocessing the defective molded articles laminated with fabric which come from the production line and are destined to be discarded.

Another object of the present invention is to provide a method which makes it possible to prevent the impairment of the physical properties and appearance of the moldings prepared by reusing the resinous material containing the fiber sheets and which enables accurate control of the parameters, such as wall thickness of the moldings, in the forming process.

The molded article laminated with fabric according to the present invention is a molding which is made from a thermoplastic resin (A) and has a fabric, made up of fibers of a highly heat resisting thermoplastic resin (B), adhered to the surface thereof, wherein the thermoplastic resin (A) of the molding contains the highly heat resisting thermoplastic resin (B) constituting the fibers and wherein the highly heat resisting thermoplastic resin (B) is present as minute particles in the thermoplastic resin (A). The minute particles of the microdispersion are typically only a few microns in diameter, which is not performed with existing processes. In a preferred embodiment the volume average of the minute particles is 10 microns or less. In the molded article laminated with fabric of the present invention, it is preferred that the content of the highly heat resisting thermoplastic resin (B) in the thermoplastic resin (A) does not exceed 20% by weight.

The method for reprocessing moldings according to the present invention relates to a method for reprocessing a molded article laminated with fabric which is made from a thermoplastic resin (A) and has a fabric, made up of fibers of a highly heat resisting thermoplastic resin (B), adhered to the surface thereof, wherein the method comprises charging an extruder with a crushed product obtained by finely crushing the molded article laminated with fabric, melt-blending the crushed product at a temperature, which is within the range of from the melting point to a temperature 50° C. higher than the melting point of the highly heat resisting thermoplastic resin (B) constituting the fibers, to thereby produce a blend resin, and extruding the blend resin from the extruder to thereby granulate the blend resin. The thermoplastic resin (B) in the form of large islands is converted into a microdispersion by blending in the extruder and extruding the blend from the extruder. That is, the melt-blending by means of an extruder converts the resin present in the form of large islands into a microdispersion of minute particles.

The size of the minute particles is less than 20 microns, generally less than 10 microns, and is approximately 1 micron in a preferred embodiment. The term micordispersion referes to a mixture of at least two compounds wherein one of the compounds is disposed as minute particles as explained herein. The micron sized particles of the microdispersion distinguishes the present invention from the various macrodispersion processes of the state of the art. The large particles used in existing processes and products are for structural purposes to reinforce the structure, whereas the present invention employs the micron particles for aesthetic purposes. Furthermore, state of the art processes teach away from using micron sized particles. Because of this microdispersion, even if the thermoplastic resin (A) is separated from the thermoplastic resin (B) at the interface thereof, the separation is very minute and therefore the basic physical properties of the thermoplastic resin (A) are hardly influenced by the separation. As the present invention involves the combination of two compounds that would not generally be combined, the manner in which the compounds are combined is important as noted by the test results herein.

Conditions suited for the implementation of the method for reprocessing a molding according to the present invention are as follow. The melt-blending temperature is within the range of from the melting point to a temperature 30° C. higher than the melting point of the highly heat resisting resin constituting the fibers. The melt-blending time is 20 to 600 seconds. The thermoplastic resin (A) is a polyolefinic resin, such as high-density polyethylene or polypropylene, a polystyrene resin, an ABS resin, a modified polyphenylene ether, or the like. The thermoplastic resin (B) is nylon or polyester.

In the case of a crystalline thermoplastic resin, the melting point as referred to in the present invention is a melting point measured by differential scanning calorimetry. In the case of a noncrystalline thermoplastic resin, the melting point is referred to in the present invention as a flow-starting temperature (a temperature at which a flow of 2 mm$^3$/second is attained under a condition using a load of 100 Kg and a die having a diameter of 1 mm and a length of 10 mm) when measured by means of a flow tester in which the resin flows down.

Still other objects and advantages of the present invention will become readily apparent to those skilled in this art from the following detailed description, wherein only a preferred embodiment of the invention is described, simply by way of illustration of the best mode contemplated for carrying out the invention. As will be realized, the invention is capable of other and different embodiments, and its several details are capable of modifications in various obvious respects, all without departing from the invention

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE PREFERRED EMBODIMENT

Figure 1:
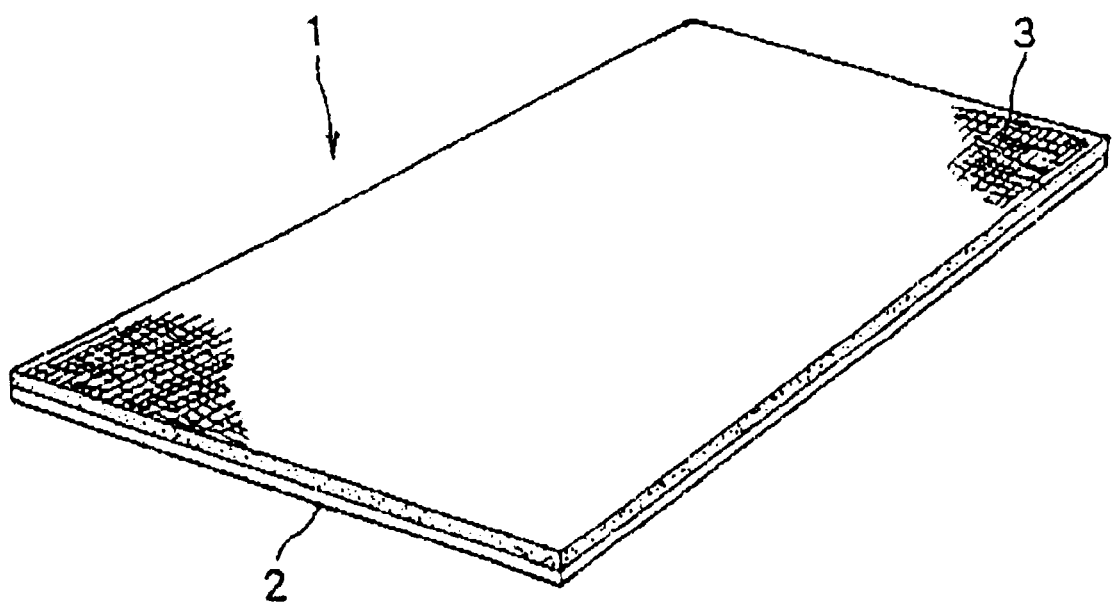
FIG. 1 is an oblique view illustrating a molded article laminated with fabric.

FIG. 1 illustrates a molded article laminated with fabric 1 that has a hollow double-wall structure in which the surface of the molding 2 has a fabric 3 comprising a fiber sheet adhered thereto. The thermoplastic resin (A), which constitutes the molding 2, is a resin whose melting point is lower than that of the thermoplastic resin (B) constituting the fibers. Examples of the thermoplastic resin (A) include high-density polyethylene, polypropylene, polystyrene resins, polyamide resins, soft polyvinyl chloride resins, hard polyvinyl chloride resins, ABS resins, AS resins, AES resins, and ASA resins as well as polyethylene terephthalate resins, polybutylene terephthalate resins, modified polyphenylene ethers, and elastomers, such as polyurethane elastomers, polystyrene elastomers, polyolefin elastomers, polyamide elastomers, and polyester elastomers, each having a lower melting point in the range of from 150 to 245° C.

Examples of the fiber sheet, which constitutes the fabric 3, include a cloth, a knitting and a nonwoven fabric which are each obtained by processing synthetic fibers, such as polyamide, e.g., nylon 6 or nylon 66, polyester, and the like, blends of these synthetic fibers, or blend fibers comprising such synthetic fibers and 20% or less of other fibers (e.g., natural fibers such as cotton, hemp, wool and silk, regenerated fibers such as viscose rayon and cupro-ammonium rayon, semi-synthetic fibers such as acetate and triacetate, and synthetic fibers such as acrylic, vinylon, polypropylene and polyurethane).

One embodiment of the present invention is a molding 2 that is made from a thermoplastic resin (A) and has a fabric 3, made up of fibers of a highly heat resisting thermoplastic resin (B), adhered to the surface. And, the thermoplastic resin (A) of the molding 2 contains a percentage of the highly heat resisting thermoplastic resin (B) constituting the fibers, wherein the highly heat resisting thermoplastic resin (B) are present as a microdispersion of melt-blended micron sized particles in the thermoplastic resin (A). In one embodiment the volume average of the minute particles is 10 microns or less, and in a preferred embodiment the minute particles are 1 micron or less. In the molded article laminated with fabric of the present invention, it is preferred that the content of the highly heat resisting thermoplastic resin (B) in the thermoplastic resin (A) does not exceed 20% by weight.

Figure 2:
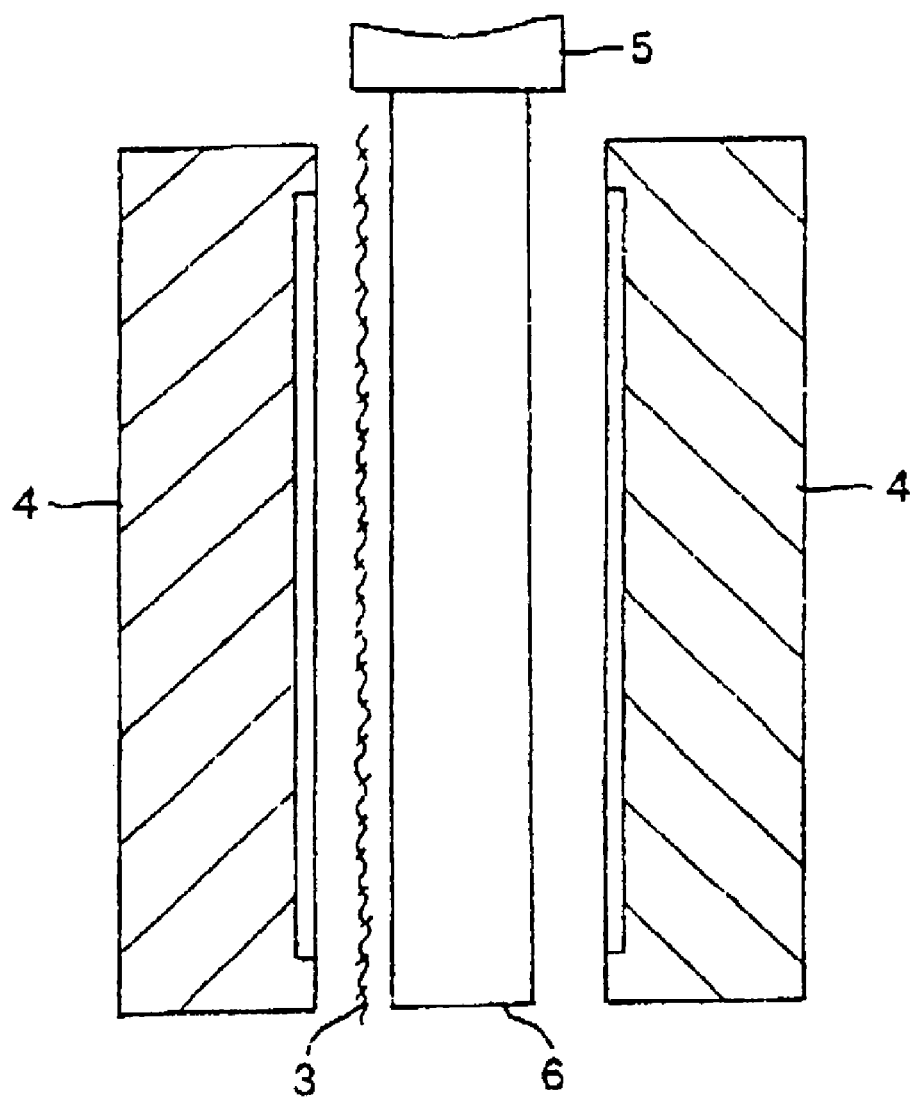
FIG. 2 is a diagram illustrating a state where a parison and a fiber sheet are disposed between mold halves.

The molded article laminated with fabric 1, which is shown in FIG. 1, is obtained by a process comprising disposing a parison 6, which is extruded from an extrusion head 5, and a fabric 3 between mold halves 4 and effecting blow-molding so that the fabric 3 adheres to the surface of the molding 2, as shown in FIG. 2. The parison is made from the thermoplastic resin (A) and contains a percentage of the highly heat resisting thermoplastic resin (B), wherein the highly heat resisting thermoplastic resin (B) is present as a microdispersion of melt-blended micron sized particles in the thermoplastic resin (A). In one embodiment the volume average of the minute particles is 10 microns or less, and in a preferred embodiment the minute particles are 1 micron or less.

In the present state of the art, when a thermoplastic resin having a fiber sheet adhered thereto is crushed in a crusher, the fiber sheet is cut into appropriate lengths thereby providing fibrous lumps having a size of several millimeters to tens of millimeters. Since the melting temperature of these fibrous lumps differs from that of the thermoplastic resin, which constitutes the molding to be prepared by blow-molding and which has a lower melting point, a molding produced from the blend of the fibrous lumps and the thermoplastic resin has a poor appearance because of the emergence of the fibers on the surface of the molding.

The industry teaches away from using small particles as it was believed that the structural integrity could only be achieved with larger particles. These prior process blends in the large sized fibers with the thermoplastic resin so that the fibers remain intact in the resulting product. This macrodispersion process employing millimeter sized macro-particles is intended to increase the strength of the end-product, but testing establishes that the desired strength is not obtained because the fibers are basically infusible and remain in the form of the fibers themselves.

Figure 3:
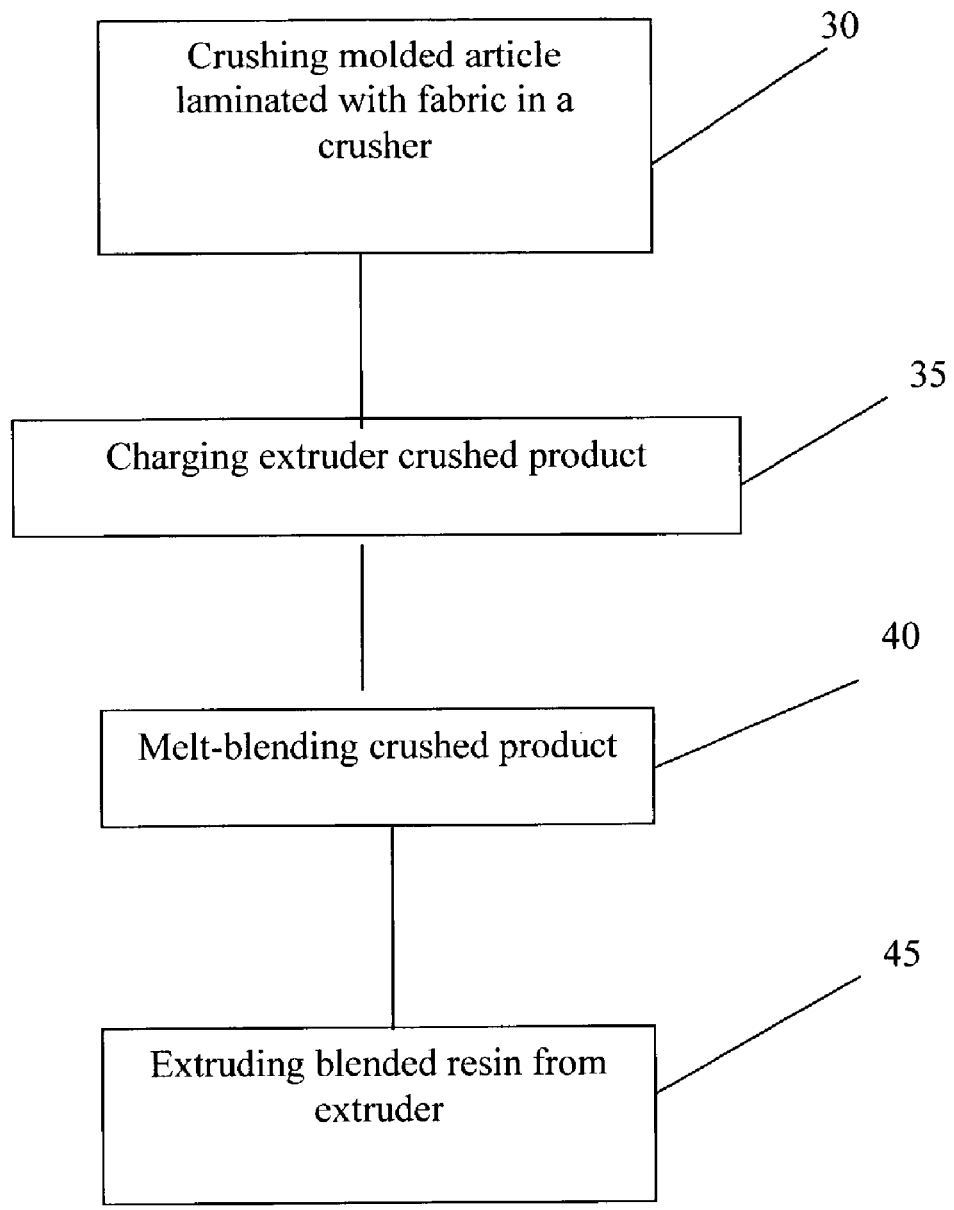
FIG. 3 is a blow diagram flowchart illustrating the steps in the process for forming the molded article laminated with fabric.

The present invention overcomes these problems, and provides a defect free appearance with sufficient strength. A general explanation of the process is described herein, although other embodiments are within the scope of the invention. Referring to FIG. 3, in one embodiment, the thermoplastic resin (A) constituting the molding is polypropylene and the highly heat resisting thermoplastic resin (B) constituting the fabric is a polyester resin (such as polyethylene terephthalate). According to the present invention, moldings or flashes having a fabric adhered thereto are crushed in a crusher 30. In this case, the polyester resin constituting the fabric is in the form of aggregates of fibers cut into a certain length and the aggregates are mixed with the crushed product of the polypropylene constituting the molding. The crushed product of polypropylene which constitutes the molding and the polyester resin in the form of fibrous lumps are charged into an extruder 35 and kept at a temperature above the melting point of the polyester resin (thermoplastic resin (B)) for a certain period of time. This treatment melts the fibrous lumps of the polyester resin and converts them into resinous lumps because the polyester resin is brought to a temperature above the melting temperature thereof.

As described herein, the size of the microdispersions is an important element of the present invention along with the melt-blending process, wherein the test results illustrate the 'sweet spot' achieved by the present invention. For example, suppose the lumps of the polyester and the crushed polypropylene are not blended by means of a screw and are present as large particles. The lumps made up of molten polyester resin exist in the form of large islands in the polypropylene which constitutes the molding. Thus the polyester resin is present as large islands in the polypropylene, providing something that resembles the foam of sea after being melted and has generally poor aesthetic qualities.

In addition, if the polypropylene and the polyester resin in the form of fibrous lumps are kept at a temperature which is 50° C. higher than the melting point of the polyester resin, thermal degradation of the plastics takes place thereby exhibiting a remarkable impairment of the physical properties.

Generally, a polyester resin is not compatible with a polypropylene resin, and therefore these resins are not miscible with each other. Therefore, the state, where the polyester resin is present as large islands in the polypropylene resulting in an appearance resembling the 'foam of sea', results in a molding with a lessened mechanical strength. This is because even a very small external force easily separates the polypropylene resin from the polyester resin at the interface thereof.

In order to overcome this problem, according to the present invention, the polyester resin in the form of large islands is converted into a microdispersion by blending in an extruder and extruding the blend from the extruder. That is, the melt-blending of the crushed product 40 by means of an extruder converts the polyester resin present as the form of large islands or macro sized particles into a microdispersion of minute particles as the blended resin is extruded from the extruder 45. The size of the minute particles is 10 microns or less on average and less than 1 micron in a preferred embodiment. Thus, whereas the state of the art maintains the large particles in the product for perceived structural integrity, the present invention employs micron sized particles and a melt-blending so the micron sized particles of thermoplastic resin B become integral with the thermoplastic resin A.

Because of this microdispersion, even if the polypropylene resin is separated from the polyester resin at the interface thereof, the separation is very minute and therefore the basic physical properties of the polypropylene are hardly influenced by the separation. Microdispersion is used herein to describe the dispersion of particles having a volume average diameter of 10 microns or less of a non-miscible material within a second material.

Accordingly, the present invention does not increase the rigidity by increasing the compatibility between the two components. Since the polyester resin is dispersed in the state of minute particles, the presence of the polyester exerts almost no influence on the basic physical properties of the polypropylene as a whole. Because of this, no additive or filler is needed for the purpose of the compatibilization. Use of a conventional extruder brings about the desired result. The extruder in the present invention may be a single-screw extruder or a twin-screw extruder. An extruder which exhibits an excellent blending performance is particularly preferred. Although a twin-screw extruder is known to exhibit an excellent blending performance, a single-screw extruder provided with a high-performance blending section, such as Maddox screw with flutes, Dalmage screw, or double-flight screw, is known. Another suitable single-screw extruder is, for example, a two-stage extruder in which screws are exchanged midway.

The blend resin, which is obtained by the above-described method of the present invention, can be satisfactorily used again for molding, such as blow molding, injection molding, or the like, by a conventional molding machine. Naturally, however, the molding temperature is a temperature suited for the molding of polypropylene (generally in the range of from 170 to 220° C.) in the case where polypropylene is used as described above, because at this temperature, the polyester does not melt. Therefore, when molded in this way, the polyester resin constituting the fabric is present in an unmelted state as in the case of a traditional molding operation. The resultant defect free article is derived from the present invention despite the fact that the polyester resin remains unmelted as in the case of a traditional molding operation. This defect free process is based on the phenomenon that the polyester resin is present in a state of microdispersion. If the polyester resin in the state of fibrous lumps is melted and dispersed by means of an extruder, the fibrous lumps of the polyester resin is converted into particles which, even if unmelted, acts as a filler and contributes to the improvement of the rigidity. It is known that if a certain amount of a filler, such as mica or talc, is incorporated into a thermoplastic resin, the physical properties such as rigidity of the molding made from the thermoplastic resin are improved. This type of filler is not in a molten state in the molten thermoplastic resin. The contribution to the improvement of the physical properties, such as rigidity, of the molding is due to the very microdispersion of the filler. The resin, which constitutes the fibers in the present invention and which is exemplified by the polyester resin, is not in a molten state in the molten polypropylene resin. The improvement of the rigidity is obtained because the polyester resin is present as minute particles and is dispersed in the polypropylene resin.

Further, according to the present invention, the blend resin, after being melted by dispersing the fibrous lumps by melt-blending, is extruded in the shape of strands which are then cut into pellets, or otherwise extruded in the shape of blocks which are then crushed by means of a crusher. In this way, the blend resin is granulated. The granules thus obtained are blended with a virgin resin or a regenerated resin which is in a crushed state and does not contain fibrous lumps. The resulting blend is subjected to a molding operation, such as blow molding, injection molding, extrusion molding, or the like, and thus recycling is performed. In the present invention, since the blend resin is granulated, the granules can be charged into the molding machine in a stable manner. Since the bulk density of the granules of the blend resin is similar to that of the virgin resin, these resins can be charged into the molding machine uniformly.

As stated above, the method for reprocessing according to the present invention makes it possible to reuse the mold flashes of the molded articles laminated with fabric or the defective portions of the molded articles laminated with fabric which has been hitherto discarded.

Further, since the method for reprocessing according to the present invention makes it possible to process all of the fabric adhered to the moldings so that the fabric is mingled in new moldings, the method is useful and advantageous to environments.

When the granules thus obtained are blended with a virgin resin, a regenerated resin, which is in a crushed state and does not contain fibrous lumps, or a blend of these resins, so as to produce moldings, the moldings produced in this way are not limited to molded articles laminated with fabric and naturally include moldings without the fabric adhered thereto.

EXAMPLES

The following examples are illustrative of the present invention and are not limiting mechanisms of the scope of the present invention. Resins used in a preferred embodiment include:

EC9 Polypropylene (hereinafter referred to as PP) manufactured by Nippon Polychem Co., Ltd., with a melting point of 162° C.

B-871 Polyethylene (hereinafter referred to as PE) manufactured by Asahi Chemical Industry Co., Ltd., with a melting point of 128° C.

The fiber sheets of the preferred embodiment are a needle punched carpet, which was made up of polyester fibers having a melting point of 255° C. (hereinafter referred to a carpet A), and a tufted carpet, which was made up of cut pile of nylon 6 fibers having a melting point of 223° C. and a base fabric of polypropylene fibers having a melting point of 162° C. (hereinafter referred to as carpet B), were used. In the carpet B, the weight ratio of the nylon fibers to the polypropylene fibers was 3:1.

The extruder of the preferred embodiment, TEM75, was manufactured by Toshiba Machine Co., Ltd. The screw diameter of this extruder was 75 mm and the motor had a power of 185 KW.

TABLE 1

|  | Plastics | Cloth |
| --- | --- | --- |
| Example 1 | PP | Carpet A |
| Example 2 | PP | Carpet B |
| Example 3 | PE | Carpet A |
| Example 4 | PE | Carpet B |
| Example 5 | PP | Carpet A |

Example 1

The molded article laminated with fabric such as shown in FIG. 1 was prepared by a blow-molding operation using PP as the thermoplastic resin (A) and the carpet A as the fabric. The machine used for the blow molding operation was a molding machine which had a screw diameter of 90 mm and an L/D ratio of screw of 24 and which was manufactured by Nippon Steel Work Corp. The resin temperature of PP was about 200° C. and the blowing pressure was about 7 Kg/cm$^2$.

After blow molding, the peripheral flashes formed were separated into portions having the fabric adhered thereto and portions having no fabric. Then, only the portions having the fabric adhered thereto were crushed in a crusher so as to obtain crushed product consisting of cubes whose sides were each about 7 mm long. The crushed product contained both cloth and resin, wherein the weight ratio of the resin to the cloth was 90:10.

The crushed product was charged into the hopper of the TEM 75 extruder manufactured by Toshiba Machine Co., Ltd., wherein the temperature of the extruder was set to the temperatures shown in Tables 2 and 3 and the crushed product was kept in the extruder for retention times shown in Tables 2 and 3. The crushed product was extruded from the head at the tip of the extruder so as to obtain strand-shaped resin having a diameter with cross-sectional area of about 3 mm. The strand was then cut into pellets, each having a length of 5 mm.

The pellets and virgin PP were blended so as to prepare a blend comprising 80% of the virgin PP and 20% of the pellets. The blend was charged into the single-screw extruder, wherein the resin temperature was set to 200° C. In this condition, a blow-molding operation was performed by using the mold, and thus a molded article laminated with fabric was obtained. In this case, the content of the fibrous resin was 2%. For the purpose of the evaluation of the molding thus obtained, the appearance was visually inspected and reduction in strength was examined by means of a tensile test (in accordance with JIS K 7113).

In the evaluation of the appearance the following symbols are used:
DF=a defect-free article;
SD=a slightly defective article having, for example, localized unmelted portions or excessively thin walls; and
MD=an article having a molding defect.

In the test of strength, the following symbols are utilized:
DF=the absence of reduction in tensile strength;
SR=a slight reduction in tensile strength; and
RR=a remarkable reduction in tensile strength.

TABLE 2

| Example | Temperture (° C.) | Time (sec) | Recycled Pellet % | Virgin Pellet % | Evaluation Appearance | Strength |
| --- | --- | --- | --- | --- | --- | --- |
| Example 1-1 | 200 | 180 | 20 | 80 | MD | RR |
| Example 1-2 | 230 | 180 | 20 | 80 | MD | RR |
| Example 1-3 | 245 | 180 | 20 | 80 | MD | RR |
| Example 1-4 | 255 | 180 | 20 | 80 | DF | DF |
| Example 1-5 | 265 | 180 | 20 | 80 | DF | DF |
| Example 1-6 | 275 | 180 | 20 | 80 | DF | DF |
| Example 1-7 | 285 | 180 | 20 | 80 | DF | DF |
| Example 1-8 | 300 | 180 | 20 | 80 | DF | DF |
| Example 1-9 | 315 | 180 | 20 | 80 | DF | RR |
| Example 1-10 | 275 | 15 | 20 | 80 | SD | SR |
| Example 1-11 | 275 | 20 | 20 | 80 | DF | DF |
| Example 1-12 | 275 | 300 | 20 | 80 | DF | DF |
| Example 1-13 | 275 | 600 | 20 | 80 | DF | DF |
| Example 1-14 | 275 | 700 | 20 | 80 | DF | RR |

It can be seen that defect-free articles can be obtained if the temperature for the formation of pellets is in the range of from 255 to 300° C. (Example 1-4~Example 1-8). If the retention time is 180 seconds for the formation of pellets, the temperature is preferably is in the range of from 265 to 285° C. (Example 1-5~Example 1-7).

If the temperature for the formation of pellets is 245° C. or below, defective appearance emerges (Example 1-1~Example 1-3). If the temperature for the formation of pellets is above 300° C., the productivity in pellet production becomes worse and the physical properties of the moldings obtained become inferior.

It can be seen that proper time for melting for the formation of pellets is in the range of from 20 to 600 seconds if the temperature is 275° C. If the time is 15 seconds, unmelted portions are present, whereas pelletization was impossible if the time was 700 seconds.

If the time was 700 seconds, the extrudate had a very low viscosity and was in the state of syrup. Because of this low viscosity, the extrudate could not be pulled to a pelletizer, and therefore the pelletization was impossible. The substance in the state of syrup was crushed and the crushed product was subjected to the same blow-molding operation. The strength of the molding thus obtained was then subjected to a test of tensile strength, and it was found that the physical properties of this molding were remarkably inferior.

Example 2

The procedure of Example 1 was repeated, except that the carpet A as used therein was replaced with the carpet B. The content of the fibrous resin was 2% by weight.

In the evaluation of the appearance the following symbols are used:
DF=a defect-free article;
SD=a slightly defective article having, for example, localized unmelted portions or excessively thin walls; and
MD=an article having a molding defect.

In the test of strength, the following symbols are utilized:
DF=the absence of reduction in tensile strength;
SR=a slight reduction in tensile strength; and
RR=a remarkable reduction in tensile strength.

It can be seen that defect-free articles can be obtained if the temperature for the formation of pellets is in the range of from 235 to 300° C. (Example 2-4~Example 2-10). If the retention time is 180 seconds for the formation of pellets, the temperature is preferably in the range of from 235 to 265° C. (Example 2-4~Example 2-7).

If the temperature for the formation of pellets is 225° C. or below, defective appearance emerges (Example 2-1~Example 2-3). If the temperature for the formation of pellets is above 300° C., pelletization was impossible.

If the temperature for the formation of pellets was above 300° C., the extrudate had a very low viscosity and was in the state of syrup. Because of this low viscosity, the extrudate could not be pulled to a pelletizer, and therefore the pelletization was impossible. The substance in the state of syrup was crushed and the crushed product was subjected to the same blow-molding operation. The strength of the molding thus obtained was then subjected to a test of tensile strength, and it was found that the physical properties of this molding were remarkably inferior.

It can be seen that proper time for melting for the formation of pellets is in the range of from 20 to 600 seconds if the temperature is 255° C. If the time is 15 seconds, unmelted portions are present, whereas, if the time is 700 seconds or more, the time is too long and the productivity in pellet production is poor. In addition, the physical properties of the moldings are inferior.

Example 3

The procedure of Example 1 was repeated, except that PP as used therein was replaced with PE. The content of the fibrous resin was 2% by weight.

In the evaluation of the appearance the following symbols are used:
DF=a defect-free article;
SD=a slightly defective article having, for example, localized unmelted portions or excessively thin walls; and
MD=an article having a molding defect.

In the test of strength, the following symbols are utilized:
DF=the absence of reduction in tensile strength;
SR=a slight reduction in tensile strength; and
RR=a remarkable reduction in tensile strength.

TABLE 3

| Example | Temperature (° C.) | Time (sec) | Recycled Pellet % | Virgin Pellet % | Evaluation Appearance | Strength |
|---|---|---|---|---|---|---|
| Example 2-1 | 200 | 180 | 20 | 80 | MD | RR |
| Example 2-2 | 215 | 180 | 20 | 80 | MD | RR |
| Example 2-3 | 225 | 180 | 20 | 80 | SD | DF |
| Example 2-4 | 235 | 180 | 20 | 80 | DF | DF |
| Example 2-5 | 245 | 180 | 20 | 80 | DF | DF |
| Example 2-6 | 255 | 180 | 20 | 80 | DF | DF |
| Example 2-7 | 265 | 180 | 20 | 80 | DF | DF |
| Example 2-8 | 275 | 180 | 20 | 80 | DF | DF |
| Example 2-9 | 285 | 180 | 20 | 80 | DF | DF |
| Example 2-10 | 300 | 180 | 20 | 80 | DF | DF |
| Example 2-11 | 310 | 180 | 20 | 80 | DF | RR |
| Example 2-12 | 255 | 15 | 20 | 80 | SD | SR |
| Example 2-13 | 255 | 20 | 20 | 80 | DF | DF |
| Example 2-14 | 255 | 300 | 20 | 80 | DF | DF |
| Example 2-15 | 255 | 600 | 20 | 80 | DF | DF |
| Example 2-16 | 255 | 700 | 20 | 80 | DF | RR |

TABLE 4

| Example | Temperature (° C.) | Time (sec) | Recycled Pellet % | Virgin Pellet % | Evaluation Appearance | Strength |
|---|---|---|---|---|---|---|
| Example 3-1 | 200 | 180 | 20 | 80 | MD | RR |
| Example 3-2 | 230 | 180 | 20 | 80 | MD | RR |
| Example 3-3 | 245 | 180 | 20 | 80 | MD | RR |
| Example 3-4 | 255 | 180 | 20 | 80 | DF | DF |
| Example 3-5 | 265 | 180 | 20 | 80 | DF | DF |
| Example 3-6 | 275 | 180 | 20 | 80 | DF | DF |
| Example 3-7 | 285 | 180 | 20 | 80 | DF | DF |
| Example 3-8 | 300 | 180 | 20 | 80 | DF | DF |
| Example 3-9 | 315 | 180 | 20 | 80 | DF | RR |
| Example 3-10 | 275 | 15 | 20 | 80 | SD | SR |
| Example 3-11 | 275 | 20 | 20 | 80 | DF | DF |
| Example 3-12 | 275 | 270 | 20 | 80 | DF | DF |
| Example 3-13 | 275 | 600 | 20 | 80 | DF | DF |
| Example 3-14 | 275 | 700 | 20 | 80 | DF | RR |

It can be seen that defect-free articles can be obtained if the temperature for the formation of pellets is in the range of from 255 to 300° C. (Example 3-4~Example 3-8). If the retention time is 180 seconds for the formation of pellets, the temperature is preferably is in the range of from 265 to 285° C. (Example 3-5~Example 3-7). If the temperature for the formation of pellets is 245° C. or below, defective appearance emerges (Example 3-1~Example 3-3).

It can be seen that proper time for melting for the formation of pellets is in the range of from 20 to 600 seconds if the temperature is 275° C. If the time is 15 seconds, unmelted portions are present, whereas, if the time is 700 seconds or more, the time is too long and the productivity in pellet production is poor. In addition, the physical properties of the moldings thus obtained are inferior.

Example 4

The procedure of Example 2 was repeated, except that PP as used therein was replaced with PE. The content of the fibrous resin was 2% by weight.

In the evaluation of the appearance the following symbols are used:
DF=a defect-free article;
SD=a slightly defective article having, for example, localized unmelted portions or excessively thin walls; and
MD=an article having a molding defect.

In the test of strength, the following symbols are utilized:
DF=the absence of reduction in tensile strength;
SR=a slight reduction in tensile strength; and
RR=a remarkable reduction in tensile strength.

TABLE 5

| Example | Temperature (° C.) | Time (sec) | Recycled Pellet % | Virgin Pellet % | Evaluation Appearance | Strength |
|---|---|---|---|---|---|---|
| Example 4-1 | 200 | 180 | 20 | 80 | MD | RR |
| Example 4-2 | 215 | 180 | 20 | 80 | MD | RR |
| Example 4-3 | 225 | 180 | 20 | 80 | SD | DF |
| Example 4-4 | 235 | 180 | 20 | 80 | DF | DF |
| Example 4-5 | 265 | 180 | 20 | 80 | DF | DF |
| Example 4-6 | 285 | 180 | 20 | 80 | DF | DF |
| Example 4-7 | 300 | 180 | 20 | 80 | DF | DF |
| Example 4-8 | 310 | 180 | 20 | 80 | DF | RR |
| Example 4-9 | 325 | 180 | 20 | 80 | DF | RR |
| Example 4-10 | 285 | 15 | 20 | 80 | SD | SR |
| Example 4-11 | 285 | 20 | 20 | 80 | DF | DF |
| Example 4-12 | 285 | 300 | 20 | 80 | DF | DF |
| Example 4-13 | 285 | 600 | 20 | 80 | DF | DF |
| Example 4-14 | 285 | 700 | 20 | 80 | DF | RR |

It can be seen that defect-free articles can be obtained if the temperature for the formation of pellets is in the range of from 235 to 300° C. (Example 4-4~Example 4-7). If the retention time is 180 seconds for the formation of pellets, the temperature is preferably in the range of from 235 to 265° C. (Example 4-4~Example 4-5). If the temperature for the formation of pellets is 225° C. or below, defective appearance emerges (Example 4-1~Example 4-3).

It can be seen that proper time for melting for the formation of pellets is in the range of from 20 to 600 seconds if the temperature is 285° C. If the time is 15 seconds, unmelted portions are present, whereas, if the time is 700 seconds or more, the time is too long and the productivity in pellet production is poor. In addition, the physical properties of the moldings thus obtained are inferior.

Example 5

The procedure of Example 1 was repeated, except that the weight of the fabric for the preparation of molded article laminated with fabric by blow molding was increased so that the ratio of the resin to the fabric in the crushed product was 70:30. The pellets obtained were each blended with a virgin material at the following ratios and respective blow-molded articles were obtained. The blending ratios for the recycled pellets were 40% by weight, 50% by weight, 60% by weight, 70% by weight, 80% by weight, 90% by weight and 100% by weight; and wherein the contents of the fibrous resin were 12% by weight, 15% by weight, 18% by weight, 21% by weight, 24% by weight, 27% by weight and 30% by weight, respectively.

In the evaluation of the appearance the following symbols are used:
DF=a defect-free article;
SD=a slightly defective article having, for example, localized unmelted portions or excessively thin walls; and
MD=an article having a molding defect.

In the test of strength, the following symbols are utilized:
DF=the absence of reduction in tensile strength;
SR=a slight reduction in tensile strength; and
RR=a remarkable reduction in tensile strength.

TABLE 6

| Example | Temperature (° C.) | Time (sec) | Recycled Pellet % | Virgin Pellet % | Fibrous Resin % | Evaluation Appearance | Strength |
|---|---|---|---|---|---|---|---|
| Example 5-1 | 275 | 180 | 40 | 60 | 12 | DF | DF |
| Example 5-2 | 275 | 180 | 50 | 50 | 15 | DF | DF |
| Example 5-3 | 275 | 180 | 60 | 40 | 18 | DF | DF |
| Example 5-4 | 275 | 180 | 70 | 30 | 21 | SD | DF |
| Example 5-5 | 275 | 180 | 80 | 20 | 24 | MD | SR |
| Example 5-6 | 275 | 180 | 90 | 10 | 27 | MD | SR |
| Example 5-7 | 275 | 180 | 100 | 0 | 30 | MD | SR |

It can be seen that defect-free articles can be obtained if the contents of the fibrous resin in the molding are up to 20% by weight (Example 5-1~Example 5-3).

The objects and advantages of the present invention may be further realized and attained by instrumentalities and combinations particularly pointed out in the appended claims. Accordingly, the drawing and description are to be regarded as illustrative in nature, and not as restrictive.

What is claimed is:

1. A method for reprocessing a molded article laminated with fabric which is made from a first thermoplastic resin and has a fabric, made up of fibers of a second thermoplastic resin adhered to the surface thereof said second thermoplastic resin having a melting temperature higher than a melting point of said first thermoplastic resin, wherein the method comprises the steps:

charging an extruder with a crushed product obtained by finely crushing the molded article laminated with fabric wherein said crushed product comprises less than 20% said second thermoplastic resin by weight;

melt-blending the crushed product at a temperature, which is greater than said melting point of said second thermoplastic resin and not more than 50° C. above said melting point of said second thermoplastic resin, to thereby produce a blend resin having a microdispersion of said second thermoplastic resin within said first thermoplastic resin, wherein a particle size of said second thermoplastic resin has a volume average diameter of about 10 microns or less; and extruding the blend resin from the extruder to thereby granulate the blend resin.

2. The method for reprocessing a molded article laminated with fabric according to claim 1, wherein the melt-blending temperature is within the range of from the melting point to a temperature 30° C. higher than the melting point of said second thermoplastic resin.

3. The method for reprocessing a molded article laminated with fabric according to claim 1, wherein the melt-blending time is between 20 to 600 seconds.

4. The method for reprocessing a molded article laminated with fabric according to claim 1, wherein said first thermoplastic resin is selected from the group consisting of a polyolefinic resin, high-density polyethylene, polypropylene, polystyrene resin, ABS resin, and modified polyphenylene ether.

5. The method for reprocessing a molded article laminated with fabric according to claim 1, wherein said second thermoplastic resin is selected from the group consisting of nylon and polyester.

6. The method for reprocessing a molded article laminated with fabric according to claim 1, wherein the granulated blend resin is blended with a virgin resin of said first thermoplastic resin, a regenerated resin thereof, or a mixture thereof and the resulting blend is subjected to blow molding.

7. The method for reprocessing a molded article laminated with fabric according to claim 1, wherein the granulated blend resin is blended with a virgin resin of said first thermoplastic resin, a regenerated resin thereof, or a mixture thereof and the resulting blend is subjected to injection molding.

8. The method for reprocessing a molded article laminated with fabric according to claim 1, wherein the granulated blend resin is blended with a virgin resin of said first thermoplastic resin, a regenerated resin thereof, or a mixture thereof and the resulting blend is subjected to extrusion molding.

9. The method for reprocessing a molded article laminated with fabric according to claim 1, wherein the granulated blend resin is blended with a virgin resin of said first thermoplastic resin, a regenerated resin thereof, or a mixture thereof and the resulting blend is subjected to press forming.

10. The method for reprocessing a molded article laminated with fabric according to claim 1, wherein the granulated blend resin is blended with a virgin resin of said first thermoplastic resin, a regenerated resin thereof, or a mixture thereof and the resulting blend is subjected to vacuum molding, compressed air molding, or vacuum/compressed air molding.

11. The method for reprocessing a molded article laminated with fabric according to claim 1, wherein the granulated blend resin is blended with a virgin resin of said first thermoplastic resin, a regenerated resin thereof, or a mixture thereof in such a manner that the content of said second thermoplastic resin does not exceed 20% by weight of the total amount of the resulting blend.

12. The method for reprocessing a molded article laminated with fabric according to claim 1, wherein a particle size of said second thermoplastic resin has a volume average diameter of about 1 micron or less.

* * * * *